United States Patent
Stemmle et al.

(10) Patent No.: US 9,006,576 B2
(45) Date of Patent: Apr. 14, 2015

(54) SYSTEM WITH A SUPERCONDUCTIVE CABLE AND A SURROUNDING CRYOSTAT

(75) Inventors: Mark Stemmle, Hannover (DE); Rainer Soika, Hannover (DE)

(73) Assignee: Nexans, Paris (FR)

( * ) Notice: Subject to any disclaimer, the term of this patent is extended or adjusted under 35 U.S.C. 154(b) by 295 days.

(21) Appl. No.: 13/529,293

(22) Filed: Jun. 21, 2012

(65) Prior Publication Data
US 2013/0174584 A1 Jul. 11, 2013

(30) Foreign Application Priority Data
Jul. 1, 2011 (EP) ..................... 11305850

(51) Int. Cl.
*H01B 12/00* (2006.01)
*H02G 15/34* (2006.01)
*H01R 43/00* (2006.01)
*H01B 12/16* (2006.01)
*F17C 1/12* (2006.01)

(52) U.S. Cl.
CPC ............... *H01B 12/00* (2013.01); *H02G 15/34* (2013.01); *H01R 43/00* (2013.01); *H01B 12/16* (2013.01); *F17C 1/12* (2013.01); *Y02E 40/648* (2013.01)

(58) Field of Classification Search
CPC ........ H01B 12/00; H01B 12/02; H01B 12/06; H01B 12/14; H01B 12/16; H01R 43/00; Y02E 40/64; Y02E 40/641; Y02E 40/645; Y02E 40/647; Y02E 40/648; F16L 59/141; F16L 59/14; F17C 1/12; H02G 15/34

USPC ........ 174/125.1, 68.1, 74 R, 15.1, 15.4, 15.5; 505/230, 231, 232, 163; 62/51.1
See application file for complete search history.

(56) References Cited

U.S. PATENT DOCUMENTS

| | | | |
|---|---|---|---|
| 4,036,618 A | 7/1977 | Leonard et al. | |
| 6,835,892 B2 * | 12/2004 | Nassi et al. ................. | 174/125.1 |
| 6,972,376 B2 * | 12/2005 | Hughey et al. ............. | 174/125.1 |
| 7,009,104 B2 * | 3/2006 | Spreafico ................... | 174/125.1 |
| 7,709,742 B2 * | 5/2010 | Allais et al. ................ | 174/125.1 |
| 7,953,466 B2 * | 5/2011 | Jang et al. .................. | 174/125.1 |
| 8,332,005 B2 * | 12/2012 | Schmidt et al. ........... | 174/125.1 |
| 8,437,819 B2 * | 5/2013 | Takayasu et al. .......... | 174/125.1 |
| 8,748,747 B2 * | 6/2014 | Soika et al. ................ | 174/125.1 |
| 2004/0255452 A1 | 12/2004 | Schippl | |

FOREIGN PATENT DOCUMENTS

| | | |
|---|---|---|
| EP | 0807938 | 11/1997 |
| EP | 1480231 | 11/2004 |
| EP | 1617537 | 1/2006 |

OTHER PUBLICATIONS

International Search Report dated Dec. 16, 2011.

* cited by examiner

*Primary Examiner* — Angel R Estrada
(74) *Attorney, Agent, or Firm* — Sofer & Haroun, LLP

(57) ABSTRACT

A superconductive cable which has a cryostat with two concentric metal pipes where the cryostat has at least a first axial section with a first axial spring constant, and at least a second axial section which has a second axial spring constant which at most is 20%, more preferred at most 10%, of the axial spring constant of the first section.

5 Claims, 1 Drawing Sheet

SYSTEM WITH A SUPERCONDUCTIVE CABLE AND A SURROUNDING CRYOSTAT

RELATED APPLICATION

This application claims the benefit of priority from European Patent Application 11 305 850.7, filed on Jul. 1, 2011, the entirety of which is incorporated by reference.

BACKGROUND

1. Field of the Invention

The present invention relates to a superconductive cable in which, in a cryostat with two concentric corrugated metal pipes whose intermediate space is evacuated for insulation, a cable core is arranged which has around a center at least one superconductive phase conductor. The center is preferably of copper or a metal material and may be of solid material or hollow, and may also consist of individual stranded conductors, and preferably has a coaxial inner cooling duct.

2. Description of Related Art

EP 1617537 describes that the length difference of the cable core, which is arranged so as to be longitudinally slidable in a cryostat, is compensated relative to a connected normal conductor by providing the normal conductor with a tubular component which surrounds the superconductive cable core so as to be longitudinally slidable.

EP 1480231 B1 describes the manufacture of a superconductive cable in which the cryostat is wound onto a cable drum, and the ends of the cable core are connected to the ends of the cryostat only in the wound-up state for achieving an excess length of the cable core relative to the cryostat, which permits a compensation of the different contraction behaviors of the cryostat relative to the cable core.

OBJECTS AND SUMMARY OF THE INVENTION

It is the object of the invention to make available a superconductive cable in which an alternative compensation for the difference of the change of length of the cryostat relative to the change of the length of the cable core during cooling is achieved.

The invention meets this object with a superconductive cable which has a cryostat with two concentric metal pipes between which is arranged a vacuum and preferably insulation material, with a cable core arranged in the cryostat extending parallel to the longitudinal axis of the cryostat, the cable core having a superconductive phase conductor around a center which preferably has an inner cooling duct. The superconductive cable according to the invention is distinguished by the fact that the cryostat has at least one first axial section with a first axial spring constant and at least one second axial section with a second axial spring constant which is at most 20%, preferably at most 10%, of the axial spring constant of the first section. Optionally, the cable core is fixed to the ends of the cryostat. In the preceding paragraph, the term "spring constant" was used to generally denote the spring constant per unit of length, particularly meters, of the first or the second sections of the cryostat, and not the spring constant of the entire section. Accordingly, in the following, the spring constant will also be referred to as specific spring constant.

Preferably, the second section of the cryostat has a length of at most 10% more preferred at most 5%, of the length of the first section.

Generally, the concentric metal pipes of the cryostat are corrugated pipes which have a ring-shaped, preferably helical circumferential corrugation. The metal pipes are made of steel, particularly high-grade steel, and are preferably manufactured by welding together two oppositely located edges of a circularly bent sheet steel which extend parallel to the longitudinal axis.

Metal materials such as copper or high-grade steel contract by about 0.3% during cooling front room temperature to the temperature of the liquid nitrogen, which is also adjusted in the state of operation of the cable, according to the invention. Thus, also in superconductive cables, cooling from ambient temperature to the temperature of the state of operation for the superconductor with liquid nitrogen has the result that the cable core contracts by about 0.3%, while the cryostat, as a combination of a contracting (cold, inner) corrugated pipe and an (outer, warmer) corrugated pipe which does not contract, contracts only by about half, i.e. about 0.15%. This difference in the contraction between cryostat and cable core has the result that passages and/or fastening devices in which the cable core is guided or fastened at the ends of the cryostat, absorb a substantial mechanical load between cryostat and cable core. This tension or load is significantly reduced in the superconductive cable according to the invention because the smaller axial specific spring constant of the second section of the cryostat is compressed to a greater extent under the load. Optionally and preferably, the cable core has an excess length relative to the cryostat and preferably has, in the method for producing an electrical connection at room or ambient temperature, an excess length between the closing pieces and/or an excess length relative to the cable core. In this embodiment, when adjusting the temperature to the operating temperature of the superconductor by filling in a cooling medium, particularly liquid nitrogen, the excess length of the cable core is reduced.

In a preferred embodiment, the superconductive cable has at each end a second section with a lower axial specific spring constant between which a first section with a first axial spring constant is arranged. If the superconductive cable has such a length that the cable has cable sleeves, in accordance with a preferred embodiment, several compensation sections which each have a second section with a lower axial specific spring constant, are arranged in the surroundings of the cable sleeves, particularly on one side or on both sides adjacent to a cable sleeve.

The lower axial specific spring constant of a second section of the cryostat can be realized by a deeper corrugation, for example, an corrugation depth which is, in relation to the corrugation depth of the first section, greater by at least 10%, preferably 15% to 20%, and/or by a greater number of corrugations per length section greater by at least 10%, preferably 15% to 20%, and/or a reduced wall thickness, particularly a wall thickness which is greater than at least 10%, preferably at least 15% to 20% in relation to the wall thickness of the first section in the second axial section of each concentric metal pipe. Alternatively or additionally, the metal pipes of the second section can consist of material for achieving a lower axial specific spring constant of material with a modulus of elasticity which is lower as compared to the material of the first section, for example, a material having a modulus of elasticity which is at least 10%, preferably at least 15% to 20% lower than the material of the first section. As material of the second section, an aluminum material, aluminum, a copper material or copper can be used, while the first section consists of high-grade steel. In embodiments in which the second section is of a different metal, for example, of an aluminum material, aluminum, a copper material or copper, a wall is preferably arranged adjacent to the first section of the metal of the second section between the inner and outer corrugated pipes of the second section. Further preferred is a wall of high-grade steel between the inner and outer corrugated pipes adjacent the second section so that the first and second sections of the cryostat are at least in the contact area at their ends provided with a wall between the inner and outer corrugated pipes of a material which is the same as the material of which the section of the cryostat consists.

Preferably, the lower axial specific spring constant of the second section is adjusted by the fact that the corrugation of the second section is ring-shaped, i.e. the corrugations are each circumferentially closed, while the corrugations of the first section have a greater specific spring constant as a result of the fact that its corrugation is helical, i.e. a continuous corrugation extending circumferentially around the longitudinal axis of the cryostat. Optionally, the second section can have, for the lower axial specific spring constant, a ring-shaped corrugation in combination with a greater corrugation depth and/or a greater number of corrugations per longitudinal section and/or a lower wall thickness and/or of a material having a lower modulus of elasticity as compared to the helically-shaped first section. Preferably, both concentric metal pipes of the cryostat in the second section have the same corrugation depth per longitudinal section, the same wall thickness, the same material, and the same type of corrugation particularly a ring-shaped corrugation.

In particular, it is preferred if the metal pipes of the cryostat are made of steel having the same composition, in particular, of identical steel, preferably with identical wall thickness. The corrugated pipe section with the lower specific spring constant (compensation section) is preferably welded to the adjacent or surrounding first section, wherein, depending on the type of construction, the sections have a common vacuum space, or the sections are separated by a wall arranged radially between the metal pipes of the cryostat, so that individual vacuum spaces are available in the various sections.

A first and a second section of the cryostat can be connected with each other by welding together their corrugated metal pipes at their end surfaces. Alternatively, the metal pipe of the first section can consist together with a second section of a single-piece longitudinally welded corrugated sheet metal, wherein the second section has a lower specific axial spring constant than the first section.

The concentric corrugated metal pipes preferably form between each other a continuous intermediate space with ring-shaped cross section, in which a vacuum is present and preferably insulating material and spacers are arranged. In an alternative embodiment, a first and a second section of the cryostat can each have a separate intermediate space with ring-shaped cross section, wherein the first and a second section are adjacent in a common plate or two adjacent parallel plates which are in contact with each other and which cover or close the intermediate space and the end faces of the concentric metal pipes.

In the assembly of a superconductive cable it is preferred between two fixed end points if at least a second section of the cryostat is mounted with an excess length, for example, with a greater radius than it assumes in the cooled state. This assembly at ambient temperature, i.e. prior to cooling the cryostat by filling in a cooling medium particularly liquid nitrogen, when filled with cooling medium i.e. in the state of operation of the superconductive cable, leads to a compensation of the difference of the length changes between cryostat and cable core.

Preferably, the cable core is fixed by means of a closing piece at each end of the cryostat. In such a closing piece can, for example, cover the inner cross section of the cryostat and a passage opening for the cable core in which the cable core is optionally fixed. In a cable core which has an axially extending cooling duct for allowing a cooling medium to flow therethrough, the cooling duct can be accessible through the passage opening for the cable core, so that a closing piece optionally can have only the passage opening for the cable core. Preferably, the cooling medium flow takes place through the cryostat between the cable core and the cryostat so that a closing piece, in addition to the passage opening for the cable core, has a passage opening for the cooling medium.

BRIEF DESCRIPTION OF THE DRAWINGS

The invention will now be described in greater detail with reference to the Figures which schematically show in FIG. 1 the construction of a superconductive cable according to the invention, show in FIG. 2 a transverse cross section of the cryostat of an embodiment of a cable according to the invention, in FIG. 3 show a transverse cross section of the cryostat of the cable according to the invention in a further embodiment.

DETAILED DESCRIPTION OF THE INVENTION

Figure 1:
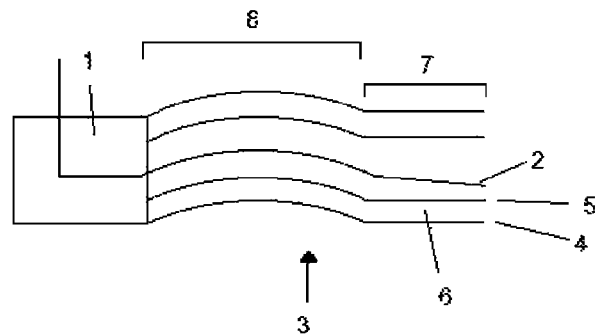

FIG. 1 shows a closing piece 1 in which the cable core 2 is secured at one end of the cryostat 3. The cryostat 3 includes an outer corrugated pipe 4 and a concentrically arranged inner corrugated pipe 4, between which insulation 6 is arranged, in particular a vacuum. The cryostat 3 also includes spacers between the outer pipe 4 and the inner pipe 5, as well as optional insulation material.

The cryostat 3 has a first section 7 with a first axial specific spring constant. In an axially adjacent area, the cryostat 3 has a second section 8 which has a second axial specific spring constant which is at most 20%, more preferably at most 10% of the axial specific spring constant of the first section 7. According to the preferred embodiment, the second section 8 of the cryostat 3 is arranged prior to filling with cooling medium, with an excess length between the fixed end points of the cable, wherein especially only the second section 8 and the axial section of the cable core 2 arranged in this second section 8 are mounted with excess length. The cable core 2 is fixed relative to the cryostat 3 at the closing piece 1, so that when cooling medium is filled into the inner pipe 5 of the cryostat 3, the cable core 2 contracts to a greater extent that cryostat 3. The lower axial specific spring constant of the second section 8 has the result that the load, which is produced by the greater contraction of the cable core 2 relative to the cryostat 3, leads predominately to a compression in the second section 8. Because of the lower axial specific spring constant of the second section 8, a greater compression of the cryostat 3 can take place there, so that the total load between cryostat 3 and cable core 2 is lower than it would be in a comparative cryostat which consists uniformly of a first section 7 over the same length.

Figure 2:
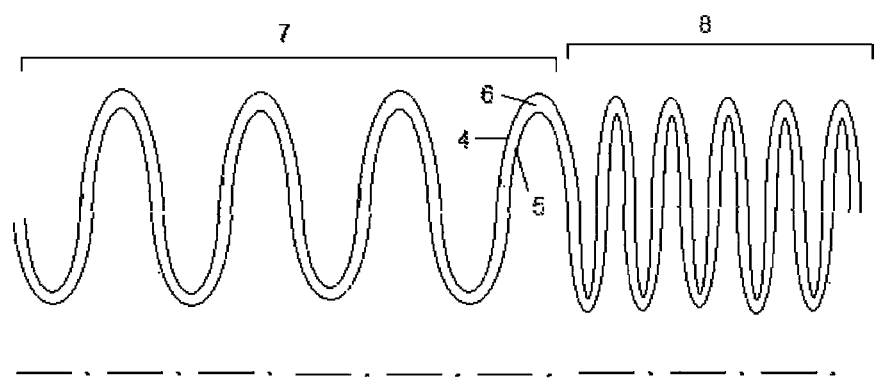
Figure 3:
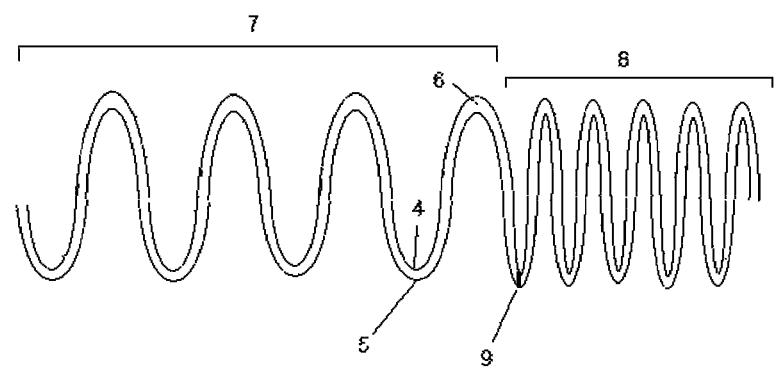

FIG. 2 shows a section through a cryostat 3 in which between two first sections 7 a second section 8 is arranged. Outer pipe 4 and inner pipe 5 of the first and second sections 7, 8 are at their end faces integrally connected to each other, for example, as a single piece or with welding connections located therebetween. In this embodiment, the cryostat 3 forms through the first section 7 and a second section 8 a uniform continuous insulation 6, particularly a continuous vacuumized intermediate space between outer pipe 4 and inner pipe 5.

FIG. 5 shows a sectional view through an alternative embodiment of the cryostat 3 in which a first section 7 is connected to a second section 8, wherein between the first section 7 and the second section 8 a wall 9 is arranged which closes the cross section between the inner pipe 5 and the outer pipe 4. In this embodiment, the first section 7 as well as the second section 8 may have a separate wall 9, 9' which each cover the ring-shaped cross section between the outer pipe 4 and the inner pipe 5, wherein the walls 9, 9' which define the first and second sections, are located adjacent each other. In this embodiment, the wall 9, 9' separates the vacuum of the insulation 6 between the first section 7 and the second section 8.

LIST OF REFERENCE NUMERALS

1 Closing piece
2 Cable core
3 Cryostat
4 Outer pipe
5 Inner pipe
6 Insulation
7 First axial section
8 Second axial section
9,9' Wall

The invention claimed is:

1. System with a superconductive cable and a cryostat, which surrounds the superconductive cable said system comprising:

a cryostat includes an outer corrugated pipe and a concentric inner corrugated pipe with an insulation, arranged between the two pipes, wherein the cable is arranged along the cryostat in the inner corrugated pipe, wherein the cable core is fixed at each end of the cryostat to the same and wherein the cryostat has in a first axial section a helically-shaped corrugation with a first specific spring constant in the axial direction, and, in a second axial section a ring-shaped corrugation with a second specific spring constant in the axial direction, which at most is 20% of the first specific spring constant.

2. System according to claim 1, wherein the second section of the cryostat comprises at most 10% of the axial length of the second section.

3. System according to claim 1, wherein the cable core at ambient temperature has an excess length as compared to the cryostat.

4. System according to claim 1, wherein the outer corrugated pipe and the concentric inner corrugated pipe of the cryostat have in the second axial section a greater corrugation depth than in the first axial section.

5. System according to claim 1, wherein the outer corrugated pipe of the respectively first and second sections are connected integrally with each other with their end faces and form a continuous intermediate space therebetween.

* * * * *